United States Patent
Tao

(10) Patent No.: US 10,104,246 B2
(45) Date of Patent: Oct. 16, 2018

(54) IMAGE FORMING APPARATUS THAT MAKES ANOTHER IMAGE FORMING APPARATUS PERFORM JOB INTERRUPTION BECAUSE OF ERROR DETECTED DURING A JOB, AND METHOD FOR CONTROLLING THE IMAGE FORMING APPARATUS

(71) Applicant: KYOCERA Document Solutions Inc., Osaka (JP)

(72) Inventor: Kozo Tao, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/595,297

(22) Filed: May 15, 2017

(65) Prior Publication Data

US 2017/0339289 A1    Nov. 23, 2017

(30) Foreign Application Priority Data

May 20, 2016   (JP) .................... 2016-101229

(51) Int. Cl.
| | |
|---|---|
| *G06F 3/12* | (2006.01) |
| *H04N 1/00* | (2006.01) |
| *G06F 11/07* | (2006.01) |
| *B41J 29/38* | (2006.01) |

(52) U.S. Cl.
CPC .......... *H04N 1/00265* (2013.01); *B41J 29/38* (2013.01); *G06F 3/121* (2013.01); *G06F 3/1234* (2013.01); *G06F 11/0703* (2013.01)

(58) Field of Classification Search
None
See application file for complete search history.

(56) References Cited

U.S. PATENT DOCUMENTS

| | | | |
|---|---|---|---|
| 2005/0179931 A1 | 8/2005 | Yamaguchi et al. | ......... 358/1.14 |
| 2008/0181651 A1* | 7/2008 | Takesada | ............... G03G 21/02 399/82 |
| 2013/0321849 A1* | 12/2013 | Masui | ............... G06K 15/1809 358/1.14 |

FOREIGN PATENT DOCUMENTS

JP      2005-219247 A      8/2005

* cited by examiner

*Primary Examiner* — Henok A Shiferaw
(74) *Attorney, Agent, or Firm* — Stein IP, LLC

(57) ABSTRACT

An image forming apparatus includes a storage portion, a communication portion, a mechanism control portion, and a main control portion. The storage portion stores various kinds of information as to the image forming apparatus. The communication portion exchanges data and instructions with another image forming apparatus. The mechanism control portion controls operation of a mechanical system in the image forming apparatus. The main control portion performs a job related to a function of the image forming apparatus by controlling operation of constituent elements including the mechanism control portion in the image forming apparatus, and transmits an instruction to make the other image forming apparatus perform the job via the communication portion if, on detecting an error, the main control portion determines that only the main control portion has been rebooted based on a specific error of the image forming apparatus that is same as the error previously in the job.

5 Claims, 3 Drawing Sheets

IMAGE FORMING APPARATUS THAT MAKES ANOTHER IMAGE FORMING APPARATUS PERFORM JOB INTERRUPTION BECAUSE OF ERROR DETECTED DURING A JOB, AND METHOD FOR CONTROLLING THE IMAGE FORMING APPARATUS

INCORPORATION BY REFERENCE

This application is based upon and claims the benefit of priority from the corresponding Japanese Patent Application No. 2016-101229 filed on May 20, 2016, the entire contents of which are incorporated herein by reference.

BACKGROUND

The present disclosure relates to an image forming apparatus and a method for controlling an image forming apparatus.

An image forming apparatus such as a copier, a printer, a facsimile machine, or the like incorporates various constituent elements such as those which govern software-implemented operations, such as image processing and data communication, and those which govern hardware-implemented operation, such as the control of motors, clutches, and heaters. On the other hand, in an image forming apparatus, there can occur an error that prevents proper operation of the individual constituent elements.

One example of errors that can occur in an image forming apparatus is a video underrun error. In an image forming apparatus, where complicated programs are run and a large amount of data has to be processed, a data bus is used at a considerably high rate. This may cause a delay when, in the image forming apparatus, data obtained through image processing by, for example, an image processing portion is stored in a storage portion or the like. As a result, image data for printing cannot be prepared in time, resulting in a video underrun error. Inconveniently, this may make it impossible for the image forming apparatus to complete a job that has to be completed and subsequently proceed to perform the next job.

In this connection, an image forming apparatus is known that is provided with a means for detecting, out of faults that are likely to be recovered from by turning the power OFF and then ON, those which can be dealt with by rebooting and a means for rebooting the hardware resources and the program for image formation processing. In this image forming apparatus, when an error occurs that prevents continuation of proper operation of the individual hardware resources (constituent elements), the entire image forming apparatus is rebooted to recover from the error and restore normal operation. Thus, this image forming apparatus can reboot itself automatically and properly without requiring any operation by the user.

SUMMARY

According to a first aspect of the present disclosure, an image forming apparatus configured to exchange data and instructions with another image forming apparatus connected thereto via a communication line includes a storage portion, a communication portion, a mechanism control portion, and a main control portion. The storage portion is configured to store various kinds of information as to the image forming apparatus. The communication portion is configured to exchange data and instructions with the other image forming apparatus. The mechanism control portion is configured to control operation of a mechanical system provided in the image forming apparatus. The main control portion is configured to perform a job related to a function of the image forming apparatus by controlling operation of constituent elements including the mechanism control portion provided in the image forming apparatus, and to transmit via the communication portion an instruction to make the other image forming apparatus perform the job if, on detecting an error, the main control portion determines that only the main control portion itself has been rebooted based on a specific error of the image forming apparatus previously in the job, the specific error of the image forming apparatus being same as the error.

According to a second aspect of the present disclosure, a method for controlling an image forming apparatus configured to exchange data and instructions with another image forming apparatus connected thereto via a communication line includes a job performing step of making a main control portion perform data processing related to a job and feed a mechanism control portion with an operation instruction for a mechanical system related to the job, an error detection step of detecting an error that prevents continuation of operation of the mechanical system included in the job being performed, a reboot detection step of detecting that only the main control portion has been rebooted based on an error same as the error previously in the job, an interruption instruction step of sending an instruction to interrupt control of the operation of the mechanical system by the mechanism control portion based on the error, a completion check step of checking for completion of the data processing, a storage processing step of storing, out of the data used in the data processing completed, uncompleted data corresponding to the operation of the mechanical system left uncompleted as a result of the interruption, a specific error check step of checking whether the error is a specific error of the image forming apparatus, a job-transfer processing step of transmitting, to the other image forming apparatus, an instruction and the uncompleted data of the job to make the other image forming apparatus perform the job if the error is the specific error, and an end processing step of deleting the data of the job if the error is not the specific error.

DETAILED DESCRIPTION

Embodiments of the present disclosure will be described below with reference to the accompanying drawings. The present disclosure is not limited to what is specifically mentioned below.

First Embodiment

Figure 1:
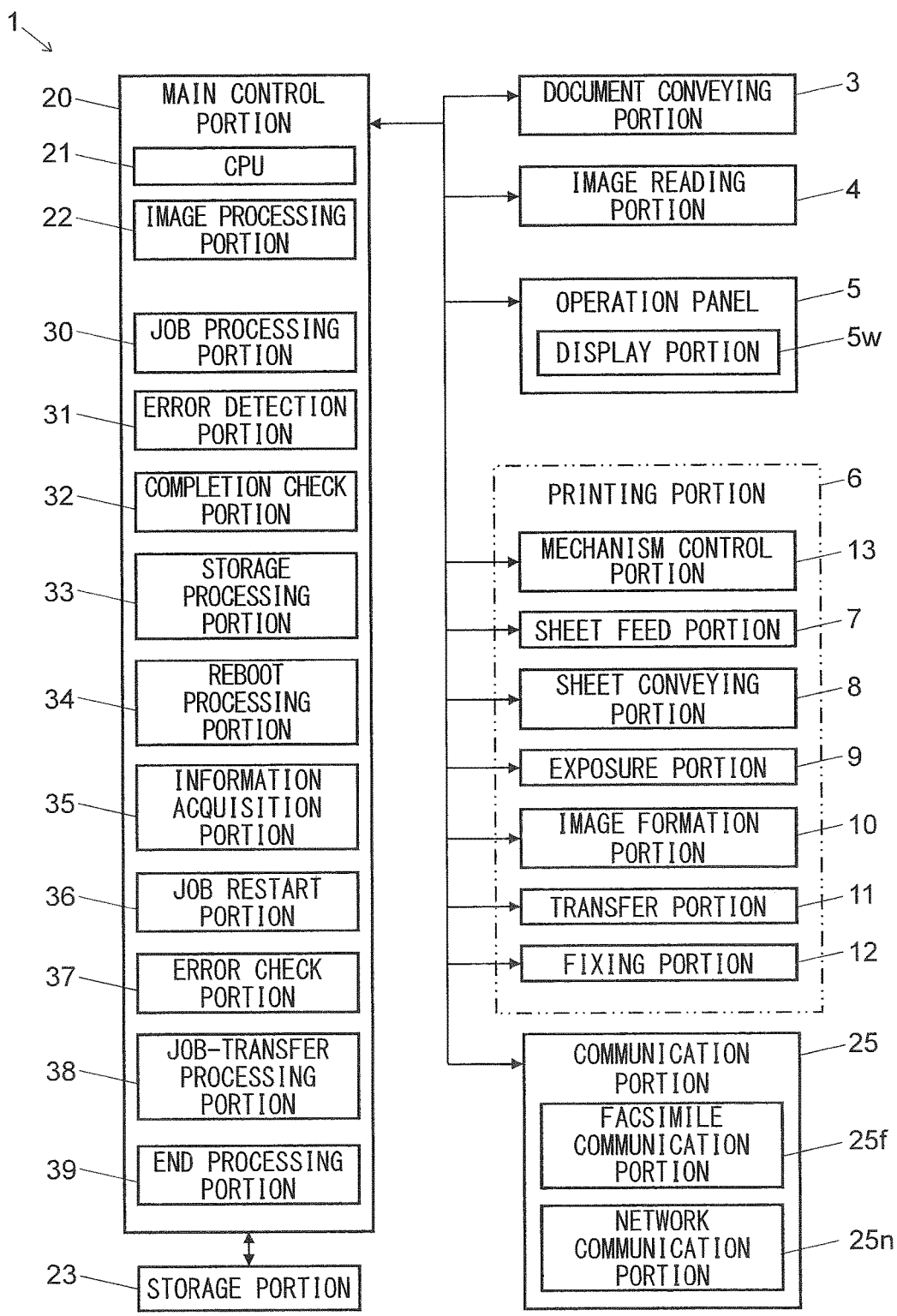
FIG. 1 is a block diagram showing a configuration of an image forming apparatus according to a first embodiment of the present disclosure.

First, as to an image forming apparatus according to a first embodiment of the present disclosure, its configuration will be described with reference to FIG. 1. FIG. 1 is a block diagram showing the configuration of the image forming apparatus. This image forming apparatus is what is called a multifunction peripheral, which is provided with a plurality of functions such as copying (printing), scanning (image-reading), and facsimile-transmitting functions.

The image forming apparatus 1 is provided with a main control portion 20 and a storage portion 23 shown in FIG. 1. The main control portion 20 includes a CPU 21, an image processing portion 22, and other unillustrated electronic circuits and components. The CPU 21 performs processing related to the functions of the image forming apparatus 1 by controlling the operation of individual constituent elements provided in the image forming apparatus 1 based on programs and data for control stored in the storage portion 23. The image processing portion 22 performs image processing on image data used in printing, image reading, and transmission. The storage portion 23 is composed of, for example, a combination of a non-volatile storage device, such as program ROM and data ROM, and a volatile storage device, such as RAM, of which none is illustrated.

In an upper part of the image forming apparatus 1, a document conveying portion 3 and an image reading portion 4 are provided. When the user wants the image forming apparatus 1 to perform an image-read job, he/she places a document carrying an image containing characters, figures, patterns, and the like on the document conveying portion 3, or places such a document on an unillustrated contact glass at the top of the image reading portion 4. The main control portion 20 gives the document conveying portion 3 and the image reading portion 4 operation instructions to make them read the image on the document.

Image data captured by the image forming apparatus 1 for copying, scanning, and the like is stored in the storage portion 23 or the like in a compressed manner for purposes including to reduce storage space. The compressed image data is decompressed to be actually used in image processing and the like.

In an upper part of the image forming apparatus 1, on the front side of the image reading portion 4, an operation panel 5 is provided. The operation panel 5 includes a display portion 5w. The operation panel 5 accepts instructions that the user gives to the image forming apparatus 1 to make it perform a copy (print) job, a scan (image-read) job, a facsimile-transmission job, and the like. The operation panel 5 accepts, for example, settings for printing conditions such as what type and size of sheets to use in printing, whether to enlarge or reduce or not, whether to perform two-sided printing or not, and also accepts input of settings such as facsimile numbers and sender names in facsimile transmission. The operation panel 5 also serves as an indication portion that, by displaying on the display portion 5w the status of the apparatus, warnings, error messages, and the like, indicates them to the user. The information entered on and accepted by the operation panel 5 is transmitted to the main control portion 20.

The image forming apparatus 1 is provided with, in a part under the image reading portion 4, a printing portion 6 for performing a print job. The printing portion 6 includes a sheet feed portion 7, a sheet conveying portion 8, an exposure portion 9, an image formation portion 10, a transfer portion 11, and a fixing portion 12. The sheet feed portion 7 contains a plurality of sheets, and feeds them out during printing. The sheet conveying portion 8 conveys the sheets fed out from the sheet feed portion 7, and discharges the sheets that have undergone fixing out of the apparatus. At a number of places in the sheet conveying portion 8, sheet detection sensors (unillustrated) for detecting the presence of a sheet are arranged, and sheet detection information from them is transmitted to the main control portion 20. The exposure portion 9 radiates toward the image formation portion 10 laser light controlled based on image data. With the laser light radiated from the exposure portion 9, the image formation portion 10 forms an electrostatic latent image of the document image, and attaches toner to the electrostatic latent image to form a toner image. The transfer portion 11 transfers the toner image formed by the image formation portion 10 to a sheet. The fixing portion 12 heats and presses the sheet having the toner image transferred to it, and thereby fixes the toner image to the sheet. Such printing operation by the printing portion 6 is controlled by the main control portion 20.

The printing portion 6 further includes a mechanism control portion 13. The mechanism control portion 13, like the main control portion 20, includes a CPU, a control circuit, a storage portion, and other unillustrated electronic circuits and components. In response to operation instructions from the main control portion 20, the mechanism control portion 13 controls the operation of the mechanical system, such as motors, clutches, and solenoids, provided in the printing portion 6.

Also the document conveying portion 3 and the image reading portion 4 are respectively provided with similar mechanism control portions, though unillustrated. These mechanism control portions control the operation of the mechanical system, such as motors, clutches, and solenoids, provided in the document conveying portion 3 and the image reading portion 4 respectively. As the representative of all those mechanism control portions, the mechanism control portion 13 in the printing portion 6 will be taken up below for a detailed description.

The image forming apparatus 1 is provided with a communication portion 25 for performing communication, such as facsimile transmission/reception and data transmission/reception, with an external communication device and an external computer, for example. The communication portion 25 includes a facsimile communication portion 25f and a network communication portion 25n. The facsimile communication portion 25f is connected to a telephone line, and by using it exchanges image data and the like with the external communication device. The network communication portion 25n is connected to a network line, and by using it exchanges image data and the like with the external computer. The main control portion 20 makes the communication portion 25 transmit and receive data to and from the external communication device and the like.

While performing an ordinary image-formation or print job, the image forming apparatus 1, on detecting in the middle of the job an error that prevents continuation of the job, performs reboot processing. An error that prevents continuation of a job can be, for example, a video underrun error. The main control portion 20 includes a job processing portion 30, an error detection portion 31, a completion check portion 32, a storage processing portion 33, a reboot processing portion 34, an information acquisition portion 35, a job restart portion 36, an error check portion 37, a job-transfer processing portion 38, and an end processing portion 39.

Here, the job processing portion 30, the error detection portion 31, the completion check portion 32, the storage processing portion 33, the reboot processing portion 34, the information acquisition portion 35, the job restart portion 36, the error check portion 37, the job-transfer processing portion 38, and the end processing portion 39 may be provided as constituent elements of the image forming apparatus 1 that are separate from the main control portion 20. Or, instead, a program including the job processing portion 30, the error detection portion 31, the completion check portion 32, the storage processing portion 33, the reboot processing portion 34, the information acquisition portion 35, the job restart portion 36, the error check portion 37, the job-transfer processing portion 38, and the end processing portion 39 may be used.

The job processing portion 30 performs data processing related to a job. The job processing portion 30 feeds the mechanism control portion 13 with operation instructions for the mechanical system related to a job. For example, for a print job, the job processing portion 30 feeds the mechanism control portion 13 with operation instructions for motors, clutches, and the like related to the print job. Moreover, when the error detection portion 31 detects an error, the job processing portion 30, based on the error, feeds the mechanism control portion 13 with an instruction to interrupt the control of the operation of the mechanical system.

The error detection portion 31 detects an error that prevents continuation of an operation of the mechanical system included in a job being performed.

The completion check portion 32 checks for completion of data processing related to a job performed by the job processing portion 30. In this connection, on receiving an instruction to interrupt the control of the operation of the mechanical system, the mechanism control portion 13 waits for completion of the operation of the mechanical system being performed and then notifies the main control portion 20 of the completion. For example, in a case where, in a print job, a sheet fed out from the sheet feed portion 7 and in the middle of being conveyed is present in a conveying passage, the mechanism control portion 13 waits for the sheet to be discharged out of the apparatus and then notifies the main control portion 20 of the completion. After the instruction to interrupt the operation of the mechanical system, the main control portion 20 waits for a notification from the mechanism control portion 13 of the completion of the operation of the mechanical system, and then makes the completion check portion 32 check for completion of the data processing.

When the operation of the mechanical system is interrupted in the middle of a job, part of the job remains as uncompleted data corresponding to the operation of the mechanical system left uncompleted as a result of the interruption. The storage processing portion 33 stores, out of the data used in the data processing that has been completed, the uncompleted data in a non-volatile storage device, such as data ROM, in the storage portion 23. Instead, the storage processing portion 33 may store the uncompleted data in an external storage device or the like via the communication portion 25. Usable as an external storage device is, for example, a shared storage device on a LAN (local area network) or a cloud storage.

The reboot processing portion 34 stores in the storage portion 23 reboot-performed information based on an error that occurs in the image forming apparatus 1. The reboot-performed information is information indicating that the main control portion 20 itself has been rebooted, and can be represented, for example, by a flag in a program. The reboot processing portion 34 reboots the main control portion 20 itself.

Further, when an error occurs in a job, the reboot processing portion 34 checks whether or not only the main control portion 20 has been rebooted based on an error the same as the error previously in the job. At this time, the reboot processing portion 34 refers to the storage portion 23 to check with the reboot-performed information to check whether or not only the main control portion 20 has been rebooted based on the same error in the job.

After the rebooting of the main control portion 20 by the reboot processing portion 34, the information acquisition portion 35 acquires from the mechanism control portion 13 mechanism information including the configuration and the status of the mechanical system, and acquires from the storage portion 23 the uncompleted data. The mechanism information includes information on configuration, such as how many sheet feed cassettes (unillustrated) are provided as sheet storage portions in the sheet feed portion 7 and whether or not any optional device is attached, and information on status, such as whether or not any warning or error has occurred.

The job restart portion 36 restarts a job based on the uncompleted data and the mechanism information acquired by the information acquisition portion 35.

The error check portion 37 checks whether or not the mechanism information acquired by the information acquisition portion 35 includes a mechanism error related to the control of the operation of the mechanical system. A mechanism error is, for example, a failure in two-sided printing.

Further, the error check portion 37 checks whether or not a same error repeated in a same job is a specific error of the image forming apparatus 1. Specific errors of the image forming apparatus 1 are errors ascribable to damage to a particular part, failure of a circuit, or the like occurring in the image forming apparatus 1, examples of which include an error dependent on a physical constituent element as a unit, a presumably repeatable error, an error occurring in a process performed by the image reading portion 4, the printing portion 6, or the like, a mechanism error, and the like. More specific examples are mechanical system underrun ascribable to data bus defect or the like, erroneous decompression of data, operation failure during two-sided printing, and the like.

The job-transfer processing portion 38, if a same error repeated in a same job is a specific error of the image forming apparatus 1, makes the communication portion 25 transmit, to another image forming apparatus, an instruction to perform the job and the data of the job to make the other image forming apparatus perform the job.

The end processing portion 39, if a same error repeated in a same job is not a specific error of the image forming apparatus 1, discards data of the job.

Figure 2:
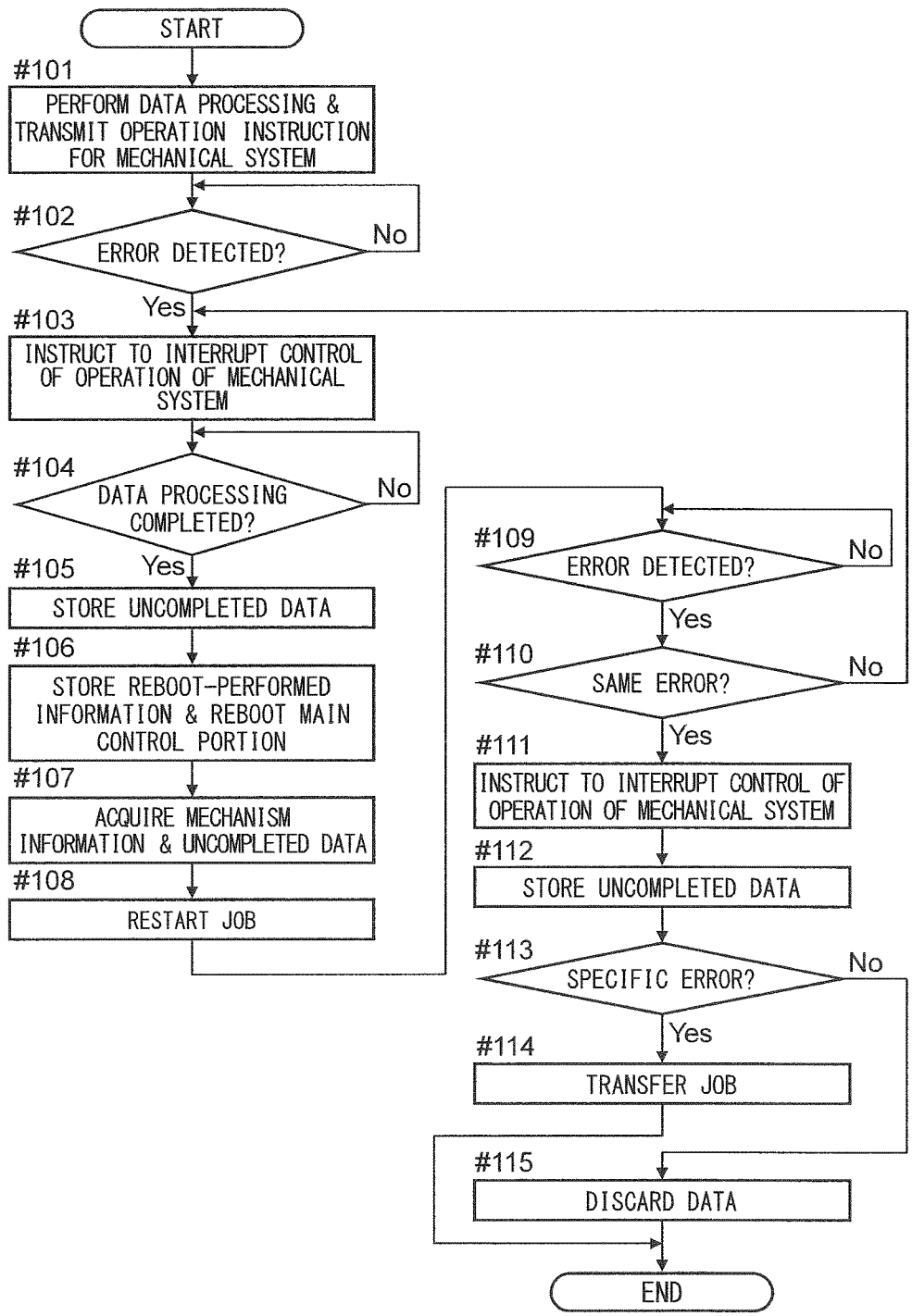
FIG. 2 is a flow chart showing an example of reboot processing in the image forming apparatus according to the first embodiment of the present disclosure.

Next, an example of reboot processing in the image forming apparatus 1 will be described with reference to FIG. 2. FIG. 2 is a flow chart showing an example of reboot processing in the image forming apparatus 1.

On accepting an instruction to perform a job via the operation panel 5 or the communication portion 25, the image forming apparatus 1 starts to perform the job (START in FIG. 2). Suppose here that the image forming apparatus 1 accepts a print job from an external computer and performs it. The image forming apparatus 1 receives print data from the external computer via the communication portion 25.

At step #101, the job processing portion 30 performs data processing related to the print job. The data processing here by the job processing portion 30 is processing for receiving the print data from the external computer and storing the print data in the storage portion 23. The job processing portion 30 then feeds the mechanism control portion 13 with an operation instruction for the mechanical system related to the print job.

At step #102, the job processing portion 30 checks whether or not the error detection portion 31 has detected an error that prevents continuation of the operation of the mechanical system included in the print job being performed. In a case where a print job is accepted from an external computer, an error that prevents continuation of the operation of the mechanical system is, for example, a video underrun error, but may instead be any other error. So long as no error is detected, the check at step #102 is repeated to continue the print job. If an error is detected, the flow proceeds to step #103.

At step #103, based on the error detected at step #102, the job processing portion 30 feeds the mechanism control portion 13 with an instruction to interrupt the control of the operation of the mechanical system. Here, the mechanism control portion 13 waits for completion of the operation of the mechanical system being performed and then notifies the main control portion 20 of the completion. For example, if, in a print job, a sheet fed out from the sheet feed portion 7 and in the middle of being conveyed is present in the conveying passage, the mechanism control portion 13 waits for the sheet to be discharged out of the apparatus and then notifies the main control portion 20 of the completion.

At step #104, the completion check portion 32 checks whether or not the data processing related to the print job being performed by the job processing portion 30 has been completed. That is, the completion check portion 32 checks whether or not the processing for receiving the print data from the external computer and storing the print data in the storage portion 23 has been completed. Here, the main control portion 20 waits for a notification from the mechanism control portion 13 of completion of the operation of the mechanical system, and then makes the completion check portion 32 check whether or not the data processing has been completed. If the data processing has not been completed, while the check at step #104 is being repeated, the data processing is continued. If the data processing has been completed, the flow proceeds to step #105.

At step #105, the storage processing portion 33 stores in the storage portion 23, out of the data used in the data processing completed at step #104, uncompleted data of the print job corresponding to the operation of the mechanical system left uncompleted as a result of the interruption of the operation of the mechanical system.

At step #106, based on the error detected at step #102, the reboot processing portion 34 stores reboot-performed information in the storage portion 23. The reboot processing portion 34 then reboots the main control portion 20 itself.

At step #107, the information acquisition portion 35 acquires from the mechanism control portion 13 mechanism information including information on the configuration and the status of the mechanical system, and acquires from the storage portion 23 the uncompleted data.

At step #108, the job restart portion 36 restarts the job by using the uncompleted data and the mechanism information acquired by the information acquisition portion 35.

At step #109, the job processing portion 30 checks whether or not the error detection portion 31 has detected an error that prevents continuation of the operation of the mechanical system included in the print job being performed. So long as no error is detected, while the check at step #109 is being repeated, the print job is continued. If an error is detected, the flow proceeds to step #110.

At step #110, as to the error that has occurred at step #109, the reboot processing portion 34 checks whether or not only the main control portion 20 has been rebooted based on an error the same as the error previously in the print job being performed. At this time, the reboot processing portion 34 refers to the storage portion 23 to check with the reboot-performed information. If negatively determined, the flow proceeds to step #103. If affirmatively determined, the flow proceeds to step #111.

At step #111, based on the error determined at step #110 to be the same as a previous error in the job being performed, the job processing portion 30 feeds the mechanism control portion 13 with an instruction to interrupt the control of the operation of the mechanical system.

At step #112, the storage processing portion 33 stores, in the storage portion 23, uncompleted data of the print job corresponding to the operation of the mechanical system left uncompleted as a result of the interruption of the operation of the mechanical system instructed at step #111.

At step #113, the error check portion 37 checks whether or not the same error repeated in the interrupted print job is a specific error of the image forming apparatus 1. If the error is a specific error of the image forming apparatus 1, the flow proceeds to step #114. If the error is not a specific error of the image forming apparatus 1, the flow proceeds to step #115.

At step #114, the job-transfer processing portion 38 makes the communication portion 25 transmit, to the other image forming apparatus, an instruction to perform the interrupted print job and the uncompleted data of the interrupted print job to make the other image forming apparatus perform the interrupted print job. To the other image forming apparatus, to which the print job is to be transferred, data representing the pages necessary for the transfer of the interrupted job, that is, the uncompleted data, is transmitted, and together therewith, for example, information on printing settings such as one-sided printing, two-sided printing, and the like is also transmitted. The image forming apparatus to which the print job has been transferred performs printing of the pages in the print job, data of which has been received from the image forming apparatus 1, at which a specific error thereof has occurred.

As for the external computer, which has instructed the image forming apparatus 1 to perform the print job, it is notified of the fact that the print job has been interrupted due to a specific error of the image forming apparatus 1 and that the rest of the print job has been transferred to the other image forming apparatus. Such a message is displayed on a display portion, such as a monitor, of the external computer. This completes the reboot processing of the image forming apparatus 1 (END in FIG. 2).

Here, it is assumed that the other image forming apparatus is previously determined to which a job is to be transferred in the case where a specific error of the image forming apparatus 1 is detected, the specific error repeated even after rebooting, and information of such an image forming apparatus is stored in the storage portion 23. The other image forming apparatus as a job-transfer destination is preferably an image forming apparatus made by the same manufacturer and of the same model as the image forming apparatus 1, but may be one of a different model, or one made by a different manufacturer.

At step #115, the end processing portion 39 discards the data of the interrupted print job. The external computer, which has requested the image forming apparatus 1 to perform the print job, is notified of the fact that the print job has been interrupted due to an error that is not a specific error of the image forming apparatus 1 and that the print job has been ended without transferring the rest of the print job. Such a message is displayed on the display portion, such as the monitor, of the external computer. This completes the reboot processing of the image forming apparatus 1 (END in FIG. 2).

As described above, on detecting an error (for example, a video underrun error) that prevents continuation of the operation of the mechanical system included in a print job being performed, the image forming apparatus 1 stores uncompleted data of the print job and thereby carries over the status of the print job before the occurrence of the error. The image forming apparatus 1 then restarts the print job by using the uncompleted data, and thereby avoids performing from the beginning the print job that has proceeded halfway.

Further, in a case where a specific error of the image forming apparatus 1 is detected, the specific error repeated even after rebooting, the image forming apparatus 1 makes the other image forming apparatus perform the job.

Second Embodiment

Figure 3:
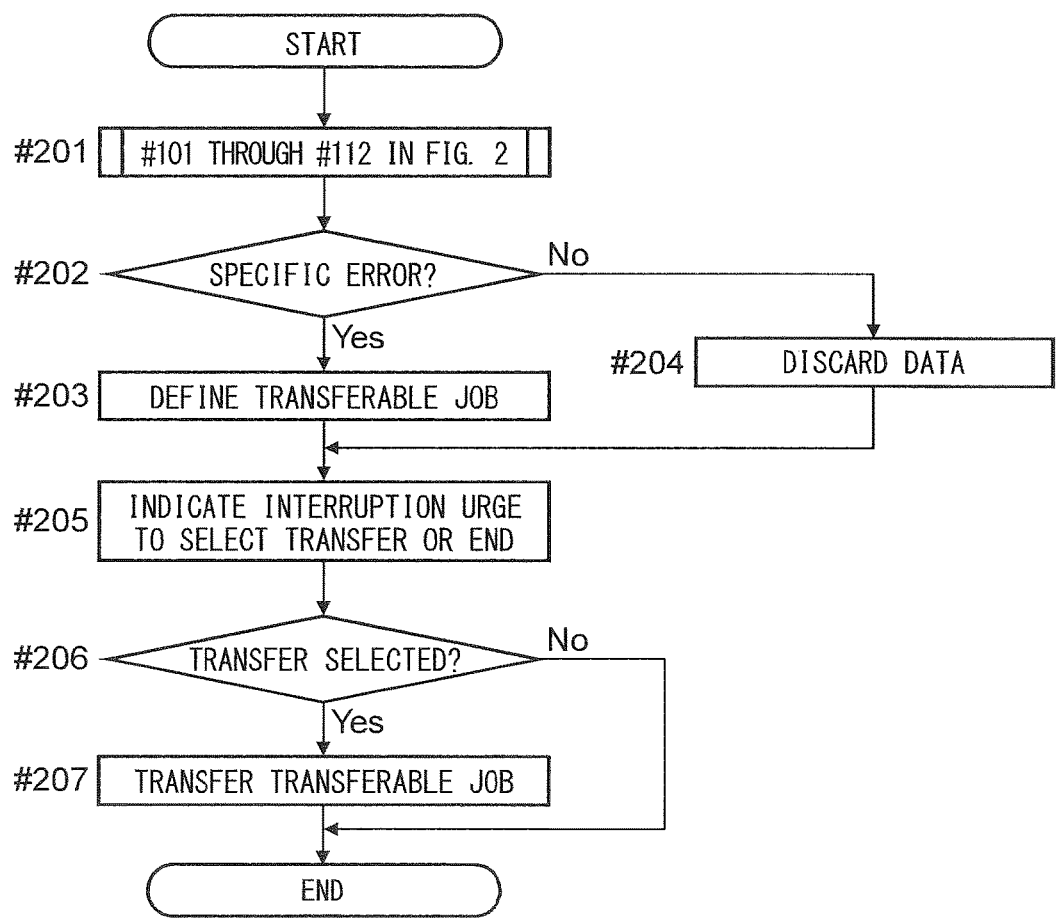
FIG. 3 is a flow chart showing an example of reboot processing in an image forming apparatus according to a second embodiment of the present disclosure.

Next, an image forming apparatus according to a second embodiment of the present disclosure will be described with reference to FIG. 3. FIG. 3 is a flow chart showing an example of reboot processing in the image forming apparatus. The configuration in this embodiment is basically the same as that in the first embodiment; accordingly, such constituent elements as are found also in the first embodiment are identified by common reference signs or part names, and overlapping description will occasionally be omitted.

On accepting an instruction to perform, for example, a print job, the image forming apparatus 1 according to the second embodiment starts to perform the print job (START in FIG. 3).

What is performed at Step #201 is the same as what is performed at steps #101 through #112 shown in FIG. 2 and described in connection with the first embodiment, and accordingly no overlapping description will be repeated. Specifically, based on an error determined to be the same as a previous error in the print job being performed, the job processing portion 30 feeds the mechanism control portion 13 with an instruction to interrupt the control of the operation of the mechanical system. Further, the storage processing portion 33 stores, in the storage portion 23, uncompleted data of the print job corresponding to the operation of the mechanical system left uncompleted as a result of the interruption of the operation of the mechanical system.

At step #202, the error check portion 37 checks whether or not an error that has repeatedly occurred in the interrupted print job is a specific error of the image forming apparatus 1. If the error is found to be a specific error of the image forming apparatus 1, the flow proceeds to step #203. If the error is found not to be a specific error of the image forming apparatus 1, the flow proceeds to step #204.

At step #203, the job-transfer processing portion 38 defines the interrupted print job as a transferable job.

At step #204, the end processing portion 39 discards the data of the interrupted print job.

At step #205, the main control portion 20 makes the display portion 5w, which is an indication portion, indicate that the print job has been interrupted based on a specific error of the image forming apparatus 1. The display portion 5w displays a message or the like indicating that the print job is being interrupted based on the specific error of the image forming apparatus 1. The interruption of operation may instead be indicated with a warning beep or other sound, or with light emission from a light source. Further, by using the operation panel 5, based on the indication of the interruption of the operation, the main control portion 20 makes the user select transferring or ending the transferable job.

At step #206, it is checked whether or not the user has selected transferring the transferable job. If the user has selected transferring the transferable job, the flow proceeds to step #207. If the user has not selected transferring the transferable job, that is, if the user has selected ending the transferable job, the processing of rebooting the image forming apparatus 1 is ended (END in FIG. 3).

At step #207, the job-transfer processing portion 38 makes the communication portion 25 transmit, to the other image forming apparatus, an instruction to perform the transferable job and the data of the transferable job to make the other image forming apparatus perform the transferable job. This completes the reboot processing of the image forming apparatus 1 (END in FIG. 3).

As described by way of embodiments above, the image forming apparatus 1 configured to exchange data and instructions with another image forming apparatus connected thereto via a communication line includes the storage portion 23, the communication portion 25, the mechanism control portion 13, and the main control portion 20. The storage portion 23 is configured to store various kinds of information as to the image forming apparatus 1. The communication portion 25 is configured to exchange data and instructions with another image forming apparatus. The mechanism control portion 13 is configured to control the operation of the mechanical system provided in the image forming apparatus 1. The main control portion 20 is configured to perform a job related to a function of the image forming apparatus 1 by controlling the operation of constituent elements, including the mechanism control portion 13, provided in the image forming apparatus 1, and if, on detecting an error, it is determined that only the main control portion 20 has been rebooted previously in the job based on a specific error of the image forming apparatus 1 which is the same as the error, the main control portion 20 transmits via the communication portion 25 an instruction to make the other image forming apparatus perform the job.

With this configuration, in a case where a specific error of the image forming apparatus 1 is detected, the specific error repeated even after rebooting, it is possible to securely make the other image forming apparatus perform the job. In this way, it is possible to suppress wasting the operating time of the image forming apparatus 1 and wasting resources such as sheets and toner.

The main control portion 20 may include the job processing portion 30, the error detection portion 31, the completion check portion 32, the storage processing portion 33, the reboot processing portion 34, the error check portion 37, the job-transfer processing portion 38, and the end processing portion 39. The job processing portion 30 is configured to perform data processing related to a job to feed the mechanism control portion 13 with an operation instruction for a mechanical system related to the job and feed the mechanism control portion 13 with an instruction to interrupt the control of operation of the mechanical system based on an error detected by the error detection portion 31. The error detection portion 31 is configured to detect an error that prevents the continuation of the operation of the mechanical system included in the job being performed. The completion check portion 32 is configured to check for completion of the data processing related to the job. The storage processing portion 33 is configured to store in the storage portion 23, out of data used in the data processing completed, uncompleted data of the job corresponding to the operation of the mechanical system left uncompleted as a result of the interruption. The reboot processing portion 34 is configured to check whether or not only the main control portion 20 has been rebooted based on an error which is the same as the error previously in the same job. The error check portion 37 is configured to check whether or not the same error repeated in the same job is a specific error of the image forming apparatus 1. The job-transfer processing portion 38 is configured to make the communication portion 25 transmit, to the other image forming apparatus, an instruction to perform the interrupted job and the data of the interrupted job to make the other image forming apparatus perform the interrupted job, if the same error repeated is a specific error of the image forming apparatus 1. The end processing portion 39 is configured to discard the data of the interrupted job if the error repeated is not a specific error of the image forming apparatus 1.

With this configuration, it is possible to efficiently achieve individual processing including performing a job, detecting an error that prevents the continuation of the operation of the mechanical system included in the job being performed, interrupting the control of the operation of the mechanical system, storing uncompleted data of the job corresponding to the operation of the mechanical system left uncompleted as a result of the interruption, checking for rebooting of the main control portion 20 based on a same error repeated in a same job, checking as to a specific error of the image forming apparatus 1, and transferring an interrupted job to another image forming apparatus.

The image forming apparatus 1 may further include the display portion 5w, which is an indication portion for indicating that a job has been interrupted based on an error which is determined to be a specific error of the image forming apparatus 1 by the error check portion 37, and the operation panel 5 for making the user select transferring or ending the job based on the indication of the interruption of the job. If the user has selected, via the operation panel 5, transferring the interrupted job, the job-transfer processing portion 38 transmits, via the communication portion 25 to the other image forming apparatus, an instruction to perform the interrupted job and the data of the interrupted job to make the other image forming apparatus perform the interrupted job.

With this configuration, it is possible, for example, to indicate, to the user, that a job is interrupted based on a specific error of the image forming apparatus, the specific error repeated in the job and requiring rebooting of the main control portion 20. Further, it is possible to transfer the interrupted job to the other image forming apparatus based on a selection desired by the user.

The mechanism control portion 13 may be configured to, on receiving the instruction to interrupt, wait for completion of the operation of the mechanical system being performed and then notify the main control portion 20 with the completion. The main control portion 20 may be configured to, after feeding the mechanism control portion 13 with the instruction to interrupt, wait for a notification from the mechanism control portion 13 of the completion of the operation of the mechanical system and then make the completion check portion 32 check for the completion of the data processing.

With this configuration, for example, if, in a print job, a sheet fed out from the sheet feed portion 7 and in the middle of being conveyed is present in a conveying passage, the sheet is waited for to be discharged out of the apparatus, and then the main control portion 20 is notified of the completion. It is thus possible to prevent the main control portion 20 from being rebooted with a sheet in the middle of being conveyed present in the conveying passage.

It should be understood that the embodiments of the present disclosure described above are in no way meant to limit its scope; the present disclosure can be implemented with any modifications made without departing from its spirit.

For example, although in the above embodiments, a print job is taken as an example to describe the reboot processing according to the present disclosure, the target of this reboot processing is not limited to a print job, but may instead be any other job. For example, a configuration according to the present disclosure can be applied to any other job that uses the document conveying portion 3, the image reading portion 4, or any other constituent element of the image forming apparatus 1, or any optional device for the image forming apparatus 1.

What is claimed is:

1. An image forming apparatus configured to exchange data and instructions with another image forming apparatus connected thereto via a communication line, the image forming apparatus comprising:
   a communication portion configured to exchange data and instructions with the other image forming apparatus;
   a mechanism control portion configured to control operation of a mechanical system provided in the image forming apparatus;
   a main control portion configured to control operation of constituent elements including the mechanism control portion provided in the image forming apparatus; and
   a storage portion configured to store various kinds of information as to the image forming apparatus, including reboot-performed information indicating that the main control portion has been rebooted,
   wherein the main control portion is configured to perform a job related to a function of the image forming apparatus and transmit via the communication portion an instruction to make the other image forming apparatus perform the job if, on detecting an error, the main control portion determines that only the main control portion itself has been rebooted previously in the job based on an error the same as the error which is currently detected, and if the error repeated in the job which is currently performed is a specific error of the image forming apparatus, which is an error ascribable to damage to a particular part or failure of a circuit in the image forming apparatus; and
   the main control portion includes:
   an error detection portion configured to detect an error that prevents continuation of the operation of the mechanical system included in the job being performed, and
   a reboot processing portion configured to store reboot-performed information in the storage portion based on the error which the error detection portion has detected and reboot the main control portion, and to refer to the reboot-performed information in a case where the error occurs in the job which is currently performed to check whether or not only the main control portion has been rebooted based on the error the same as the error previously in the job which is currently performed.

2. The image forming apparatus according to claim 1, wherein the main control portion further includes
   a job processing portion configured to perform data processing related to the job to feed the mechanism control portion with an operation instruction for the mechanical system related to the job and feed the mechanism control portion with an instruction to interrupt control of the operation of the mechanical system based on the error which the error detection portion has detected, a completion check portion configured to check for completion of the data processing related to the job, a storage processing portion configured to store, in the storage portion, out of the data used in the data processing completed, uncompleted data of the job corresponding to the operation of the mechanism control portion left uncompleted as a result of the interruption, an error check portion configured to check whether or not the error repeated in the job is the specific error of the image forming apparatus, which is the error ascribable to damage to a particular part or failure of a circuit in the image forming apparatus, a job-transfer processing portion configured to make the communication portion transmit, to the other image forming apparatus, an instruction and data of the job interrupted to make the other image forming apparatus perform the job interrupted, if the error is the specific error of the image forming apparatus, and an end processing portion configured to discard the data of the job interrupted, if the error is not the specific error of the image forming apparatus.

3. The image forming apparatus according to claim 2, wherein the error check portion includes
- an indication portion for indicating that a job has been interrupted based on the specific error determined by the error check portion, and
- an operation portion for making a user select transferring or ending the job based on indication of the interruption of the job, and if the user selects via the operation portion transferring the job interrupted, the job-transfer processing portion makes the communication portion transmit, to the other image forming apparatus, an instruction and the data of the job interrupted to make the other image forming apparatus perform the job interrupted.

4. The image forming apparatus according to claim 2, wherein the mechanism control portion, on receiving the instruction to interrupt, waits for completion of the operation of the mechanical system being performed, and then notifies the main control portion of the completion, and after feeding the mechanism control portion with the instruction to interrupt, the main control portion waits for notification from the mechanism control portion of completion of the operation of the mechanical system, and then makes the completion check portion check for completion of the data processing.

5. A method for controlling an image forming apparatus configured to exchange data and instructions with another image forming apparatus connected thereto via a communication line, the method comprising:

a job performing step of making a main control portion perform data processing related to a job and feed a mechanism control portion with an operation instruction for a mechanical system related to the job;

an error detection step of detecting an error that prevents continuation of operation of the mechanical system included in the job being performed;

a reboot performing step of storing reboot-performed information in a storage portion based on the error which has been detected in the error detection step, and rebooting the main control portion;

a reboot detection step of referring to the reboot-performed information stored in the storage portion in a case where the error occurs in the job which is currently performed, and detecting that only the main control portion has been rebooted based on an error same as the error previously in the job which is currently performed;

an interruption instruction step of sending an instruction to interrupt control of the operation of the mechanical system by the mechanism control portion based on the error which has been determined, in the reboot detection step, to be an error same as the error based on which only the main control portion has been rebooted previously in the job which is being performed;

a completion check step of checking for completion of the data processing;

a storage processing step of storing, out of the data used in the data processing completed, uncompleted data corresponding to the operation of the mechanical system left uncompleted as a result of the interruption;

a specific error check step of checking whether the error is a specific error of the image forming apparatus, which is an error ascribable to damage to a particular part or failure of a circuit in the image forming apparatus;

a job-transfer processing step of transmitting, to the other image forming apparatus, an instruction and the uncompleted data of the job to make the other image forming apparatus perform the job if the error is the specific error; and an end processing step of deleting the data of the job if the error is not the specific error.

* * * * *